United States Patent
Chen

(10) Patent No.: US 11,522,368 B2
(45) Date of Patent: Dec. 6, 2022

(54) DEVICE HAVING A FUNCTION OF SIMULTANEOUSLY CHARGING AND BACKING UP DATA

(71) Applicant: MAKTAR INC., New Taipei (TW)

(72) Inventor: Liang-Hsin Chen, New Taipei (TW)

(73) Assignee: MAKTAR INC., New Taipei (TW)

( * ) Notice: Subject to any disclaimer, the term of this patent is extended or adjusted under 35 U.S.C. 154(b) by 0 days.

(21) Appl. No.: 17/035,707

(22) Filed: Sep. 29, 2020

(65) Prior Publication Data

US 2021/0391732 A1     Dec. 16, 2021

(30) Foreign Application Priority Data

Jun. 12, 2020    (TW) .................................. 109119877

(51) Int. Cl.
*H02J 7/00* (2006.01)
*G06F 11/14* (2006.01)

(52) U.S. Cl.
CPC ...... *H02J 7/00034* (2020.01); *G06F 11/1456* (2013.01); *G06F 11/1458* (2013.01); *H02J 7/00045* (2020.01); *H02J 2207/30* (2020.01)

(58) Field of Classification Search
CPC ........ H02J 7/00; H02J 7/00045; H02J 7/0047; H02J 7/00034; H02J 7/00036; H02J 50/80; H02J 7/0022; H02J 2207/30; G06F 11/1456; G06F 11/1458
See application file for complete search history.

(56) References Cited

U.S. PATENT DOCUMENTS

| | | | | |
|---|---|---|---|---|
| 5,652,502 A | * | 7/1997 | van Phuoc | H01M 10/48 324/427 |
| 8,000,755 B2 | * | 8/2011 | Anzai | H04M 1/72409 455/411 |
| 8,080,975 B2 | * | 12/2011 | Bessa | H02J 7/0044 320/101 |
| 8,578,187 B1 | * | 11/2013 | Wong | G06F 1/1632 713/300 |
| 9,729,003 B1 | * | 8/2017 | Chow | H02J 50/10 |
| 10,503,667 B1 | * | 12/2019 | Simon | H04L 12/2834 |
| 11,133,681 B2 | * | 9/2021 | Yip | H02J 7/0021 |

(Continued)

FOREIGN PATENT DOCUMENTS

| | | |
|---|---|---|
| CN | 101111020 A | 1/2008 |
| CN | 102708025 A | 10/2012 |
| CN | 109863676 A | 6/2019 |

*Primary Examiner* — Helen Rossoshek
(74) *Attorney, Agent, or Firm* — Anova Law Group, PLLC

(57) ABSTRACT

A device having a function of simultaneously charging and backing up data is provided. The device includes a transmission interface, a power supply circuit, a storage circuit, and a main control circuit. The transmission interface is connected to an electronic device. The power supply circuit is configured to supply power to the electronic device to charge the electronic device. The storage circuit is configured to access data of the electronic device, or to provide data stored in the storage circuit to the electronic device. The main control circuit is connected to the transmission interface, the power supply circuit and the storage circuit. The main control circuit is configured to control the power supply circuit to supply the power to the electronic device and the storage circuit to back up the data simultaneously.

4 Claims, 9 Drawing Sheets

(56) References Cited

U.S. PATENT DOCUMENTS

| | | | |
|---|---|---|---|
| 2005/0195975 A1* | 9/2005 | Kawakita | H04L 9/3236 380/30 |
| 2008/0222431 A1 | 9/2008 | Paniagua et al. | |
| 2010/0277119 A1* | 11/2010 | Montague | A61B 5/1486 600/301 |
| 2012/0330888 A1* | 12/2012 | Cruz | G06F 1/26 707/610 |
| 2013/0306726 A1* | 11/2013 | Wong | H02J 7/0029 235/440 |
| 2015/0244201 A1* | 8/2015 | Chu | H02J 50/40 320/108 |
| 2017/0373522 A1* | 12/2017 | Pelosi | H04B 5/0031 |
| 2018/0046236 A1* | 2/2018 | Erturk | H02M 3/33507 |
| 2018/0137077 A1* | 5/2018 | Chen | G06F 13/102 |
| 2019/0243551 A1* | 8/2019 | Xu | G06F 11/3055 |
| 2020/0166980 A1* | 5/2020 | Wu | H02J 7/00 |
| 2020/0241617 A1* | 7/2020 | Liu | G06F 1/1632 |
| 2020/0280198 A1* | 9/2020 | Kwon | H04B 5/0081 |
| 2020/0412862 A1* | 12/2020 | Oh | H04W 76/14 |

\* cited by examiner

DEVICE HAVING A FUNCTION OF SIMULTANEOUSLY CHARGING AND BACKING UP DATA

CROSS-REFERENCE TO RELATED PATENT APPLICATION

This application claims the benefit of priority to Taiwan Patent Application No. 109119877, filed on Jun. 12, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a charging device, and more particularly to a device having a function of simultaneously charging and backing up data.

BACKGROUND OF THE DISCLOSURE

With the rapid development of society, people are increasingly dependent on electronic products. Sizes of the electronic products have become smaller and smaller, such that batteries accommodated in the electronic products often cannot supply sufficient power. Therefore, mobile power banks have been developed. The mobile power bank is connected to the electronic product through a charge and data transmission wire and configured to supply sufficient power to the electronic product, such that the electronic product operates normally. However, the electronic product such as a mobile phone often needs to be charged for a longer period of time.

Data of the electronic products such as the mobile phone may be transmitted to a computer through the charge and data transmission wire and be backed up by the computer. However, when a user loses the cell phone or failures occur on the cell phone, the cell phone needs to be recovered and then a large amount of data needs to be backed up for very long periods of time, which is an inconvenience for the daily life of the user.

A conventional charger device only has a charging function. Therefore, when the conventional charger device such as the mobile power bank is used to charge the cell phone and then a data storage device such as the computer is used to back up the data of the cell phone, long periods of time are required and it is extremely inconvenient for the user.

SUMMARY OF THE DISCLOSURE

In response to the above-referenced technical inadequacies, the present disclosure provides a device having a function of simultaneously charging and backing up data. The device having a function of simultaneously charging and backing up data includes one or more transmission interfaces, a power supply circuit, a storage circuit and a main control circuit. Each of the transmission interfaces is connected to an electronic device and configured to receive data from the electronic device or transmit data to the electronic device. The power supply circuit is connected to the transmission interfaces and configured to supply power to the electronic devices respectively through the transmission interfaces to charge the electronic devices. The storage circuit is configured to access the data of the electronic devices or provide the data stored in the storage circuit. The main control circuit is connected to the transmission interfaces, the power supply circuit and the storage circuit. The main control circuit is configured to control the power supply circuit to charge the electronic devices. The main control circuit is configured to transmit the data from one of the electronic devices through the transmission interface to the storage circuit, and control the storage circuit to access the data and backup the data when the electronic devices are charged.

In certain embodiments, when the electronic devices are charged by the power supply circuit, the main control circuit transmits the data stored in the storage circuit to one of the electronic devices through one of the transmission interfaces.

In certain embodiments, the electronic devices are connected to the main control circuit respectively through the transmission interfaces, and the main control circuit gives permission to each of the electronic devices to be charged by the power supply circuit and gives permission to at least one of the electronic devices to be charged by the power supply circuit and transmit data to or from one of the transmission interfaces simultaneously.

In certain embodiments, one of the electronic devices that is most preferentially connected to the main control circuit is given permission to be charged and transmit the data simultaneously by the main control circuit.

In certain embodiments, when connection between one of the transmission interfaces and one of the electronic devices that is given permission to be charged and transmit the data simultaneously is released, another of the electronic devices is given permission to be charged and transmit the data simultaneously by the main control circuit.

In certain embodiments, the device further includes an interface access switching circuit. The interface access switching circuit is connected to the main control circuit and configured to allow the storage circuit to be connected to one of the electronic devices through the main control circuit.

In certain embodiments, the device further includes a power source control circuit. The power source control circuit is connected to the transmission interfaces and the power supply circuit. The power source control circuit is configured to obtain a power demand message from each of the electronic devices through each of the transmission interfaces, and accordingly controls the power supply circuit to supply power to each of the electronic devices.

In certain embodiments, the device further includes an interface control switching circuit. The interface control switching circuit is connected between the main control circuit and each of the transmission interfaces. The interface control switching circuit is configured to allow each of the transmission interfaces to be connected to the main control circuit through the interface control switching circuit or prohibit each of the transmission interfaces from being connected to the main control circuit through the interface control switching circuit.

In certain embodiments, the device further includes an identifying unit. The identifying unit is connected to the interface control switching circuit and configured to identify each of the electronic devices and accordingly control the interface control switching circuit.

In certain embodiments, the device further includes an authorization unit. The authorization unit is connected to the main control circuit. The main control circuit controls the authorization unit to output an authorization message to each of the electronic devices to give permission to each of the electronic devices to access the data according to an authentication request of each of the electronic devices.

As described above, the present disclosure provides the device having the functions of simultaneously charging and backing up data, which is able to charge the electronic devices, such as the cell phone or the laptop and back up the data of the electronic device simultaneously, thereby saving time for a user. The device of the present disclosure is convenient to carry and use for simultaneously charging and backing up data without using additional devices.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
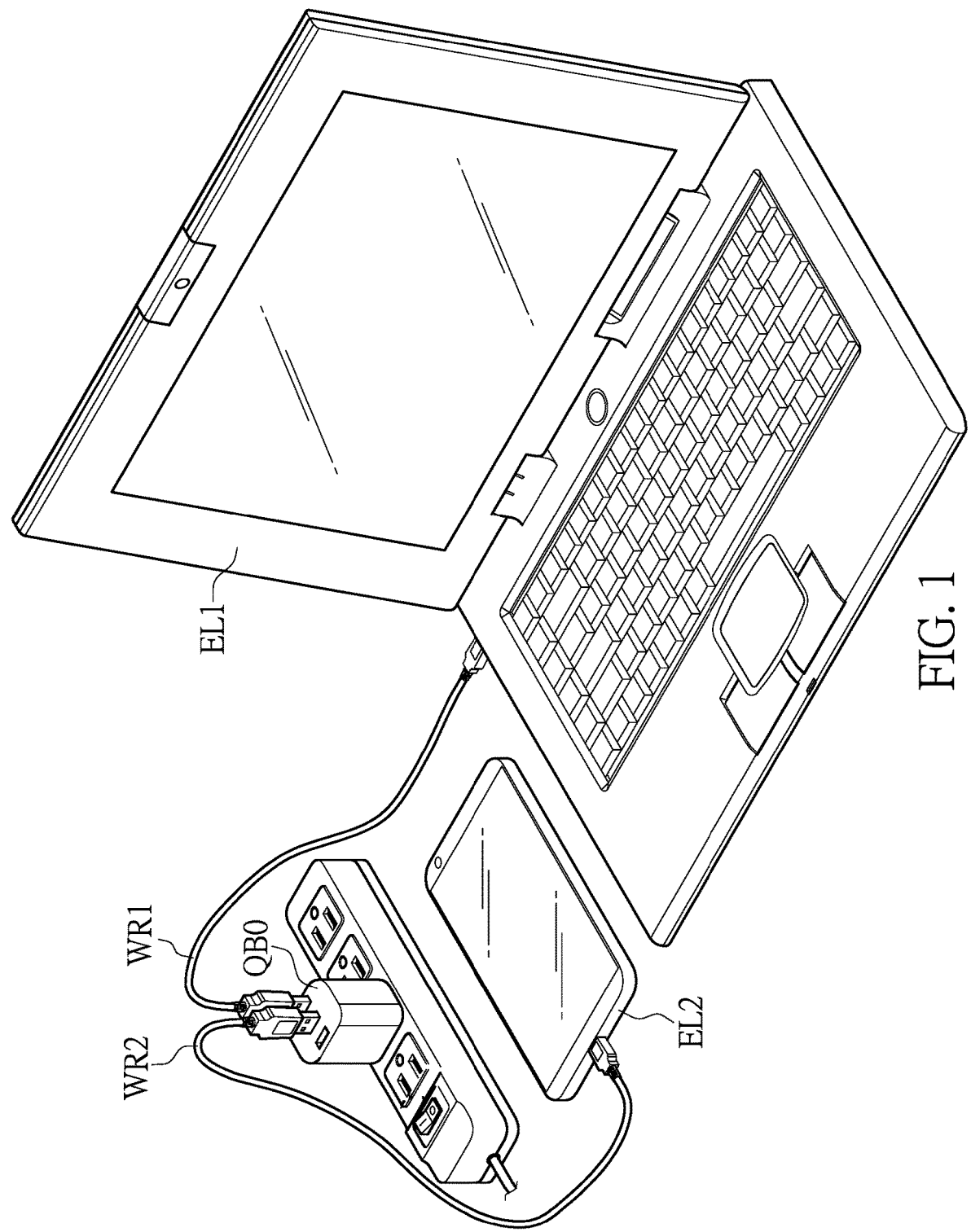
FIG. 1 is a schematic view of a device having a function of simultaneously charging and backing up data according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a schematic view of a device having a function of simultaneously charging and backing up data according to an embodiment of the present disclosure.

In the embodiment, a device QB0 having a function of simultaneously charging and backing up data includes a power supply circuit (not shown in figures). The power supply circuit may be connected to an external power source and receive power from the external power source. For example, as shown in FIG. 1, a plug of the device QB0 may be inserted into an extension socket such that the power supply circuit of the device QB0 is connected to the external power source, and the power supply circuit is charged by the external power source. For example, the extension socket may have three holes and the power supply circuit may be a battery, but the present disclosure is not limited thereto.

When the device QB0 has sufficient power, no matter whether the device QB0 has been charged or is being charged, the device QB0 can be applied to charge various electronic devices and back up data of the electronic devices. As shown in FIG. 1, in the embodiment, a first electronic device EL1 is a laptop and a second electronic device EL2 is a cell phone, but the present disclosure is not limited thereto. In practice, the quantity of electronic devices may be adjusted, the laptop and the cell phone may be replaced by other types of electronic devices, and different operating systems may be installed on the electronic devices. It should be understood that, the terms "first" and "second" used herein are only used to describe and distinguish different components, and do not mean that the components are arranged in a specific order or are specific types of components.

In the embodiment, the device QB0 may have a plurality of socket holes such as three socket holes shown in FIG. 1. One terminal end of a first charge and data transmission wire WR1 may be inserted in a first socket hole among the plurality of socket holes. The other terminal end of the first charge and data transmission wire WR1 may be inserted in a connection port or a connection hole of the first electronic device ELL As a result, the first electronic device EL1 is connected to the device QB0 through the first charge and data transmission wire WR1.

On the other hand, one terminal of a second charge and data transmission wire WR2 may be inserted in a second socket hole among the plurality of socket holes. The other terminal of the second charge and data transmission wire WR2 may be inserted in a connection port or a connection hole of the second electronic device EL2. As a result, the second electronic device EL2 is connected to the device QB0 through the second charge and data transmission wire WR2.

When the device QB0 is connected to the electronic devices such as the first electronic device EL1 and the second electronic device EL2 as shown in FIG. 1, the device QB0 may synchronously charge the electronic devices and back up data of the electronic device.

Figure 2C:
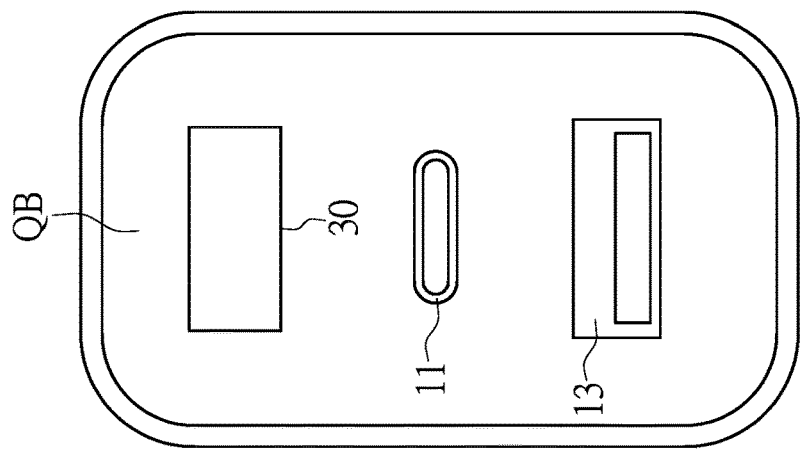
FIG. 2C is a schematic view of an appearance of a device that has a function of simultaneously charging and backing up data and includes different types of two transmission interfaces according to an embodiment of the present disclosure.
Figure 2B:
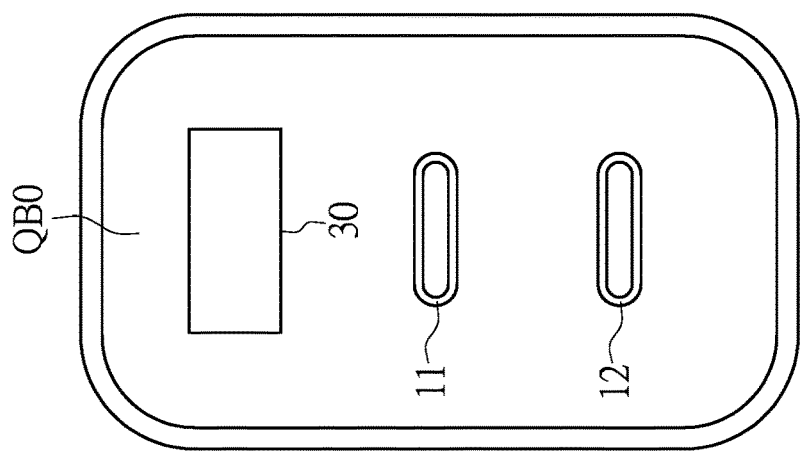
FIG. 2B is a schematic view of an appearance of a device that has a function of simultaneously charging and backing up data and includes a same type of two transmission interfaces according to an embodiment of the present disclosure.
Figure 2A:
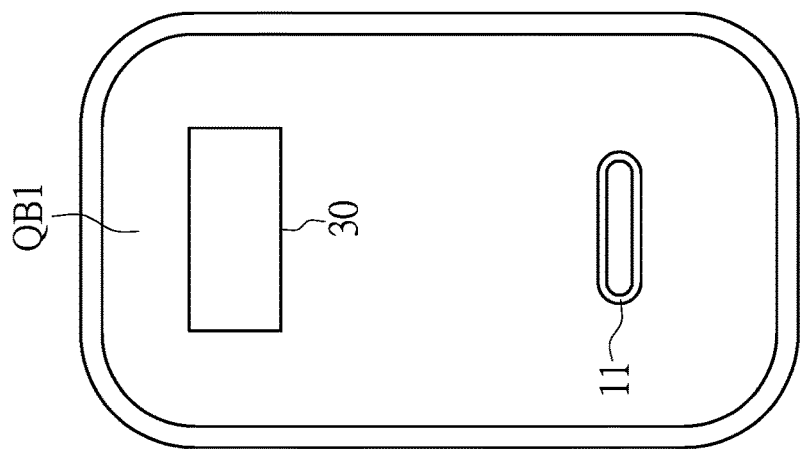
FIG. 2A is a schematic view of an appearance of a device that has a function of simultaneously charging and backing up data and includes one transmission interface according to an embodiment of the present disclosure.

Reference is made to FIG. 2A, which is a schematic view of an appearance of a device that has a function of simultaneously charging and backing up data and includes one transmission interface according to an embodiment of the present disclosure.

In the embodiment, the device QB1 may include one transmission interface, such as a first transmission interface 11 shown in FIG. 2A. One terminal of a charge and data transmission wire may be inserted in a slot of the first transmission interface 11. The other terminal of the charge and data transmission wire may be inserted in a connection port or a connection hole of an electronic device. As a result, the electronic device is connected to a device QB1 having a function of simultaneously charging and backing up data through the charge and data transmission wire. When the electronic device is connected to the device QB1, the device QB1 may synchronously charge the electronic device and back up the data of the electronic device.

Reference is made to FIG. 2B, which is a schematic view of an appearance of a device that has a function of simultaneously charging and backing up data and includes the same type of two transmission interfaces according to an embodiment of the present disclosure.

A difference between the device QB1 of FIG. 2A and the device QB0 of FIG. 2B is that the device QB0 includes two transmission interfaces, such as the first transmission interface 11 and a second transmission interface 12 shown in FIG. 2B.

For example, in the embodiment, the first transmission interface 11 and the second transmission interface 12 are the same type of USB transmission interfaces, such as Type-A, Type-B, Type-C, or other types of transmission interfaces, but the present disclosure is not limited thereto.

Reference is made to FIG. 2C, which is a schematic view of an appearance of a device that has a function of simultaneously charging and backing up data and includes different types of two transmission interfaces according to an embodiment of the present disclosure.

In the embodiment, a device QB having a function of simultaneously charging and backing up data includes two transmission interfaces, such as different types of the first transmission interface 11 and a third transmission interface 13 as shown in FIG. 2C.

Figure 3A:
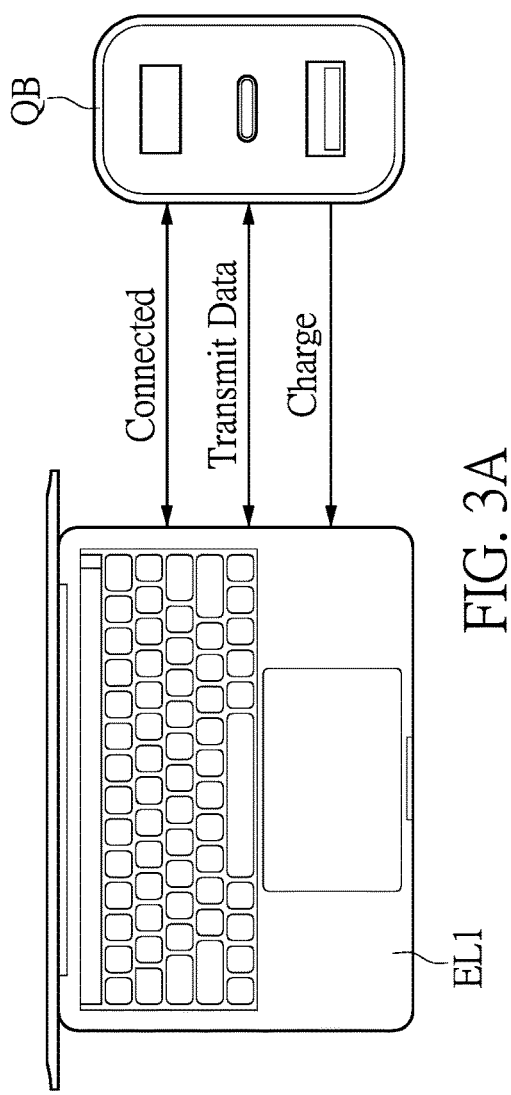
FIG. 3A is a schematic view of a device that has the function of simultaneously charging and backing up the data and is applied to a laptop according to an embodiment of the present disclosure.
Figure 3B:
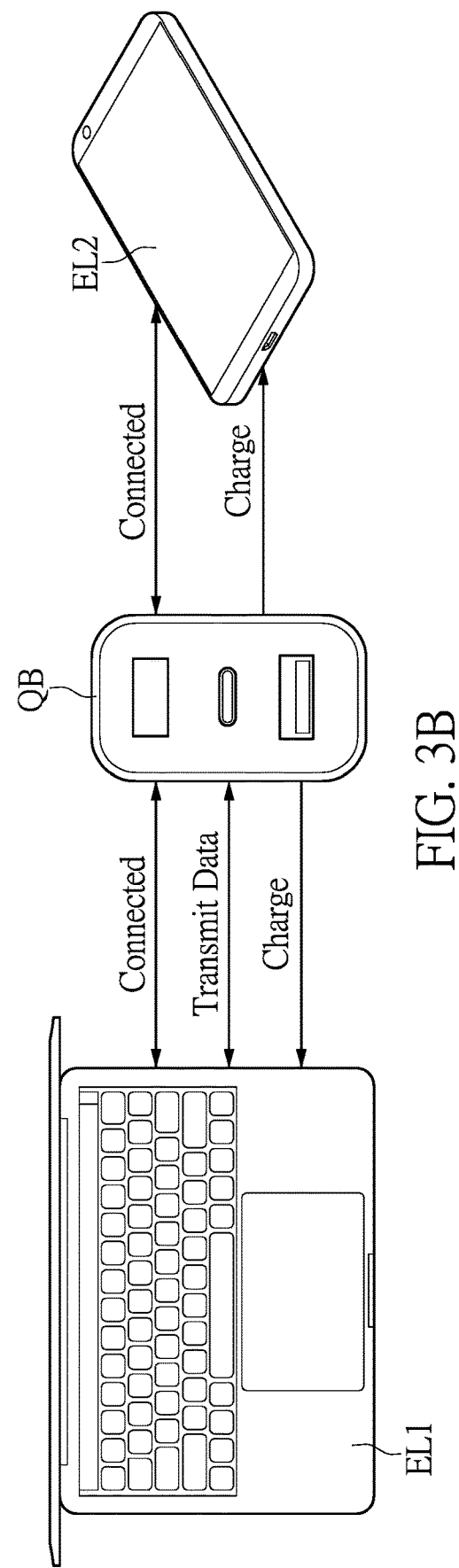
FIG. 3B is a schematic view of a device that has the function of simultaneously charging and backing up the data and is applied to the laptop and a cell phone according to the embodiment of the present disclosure.
Figure 3C:
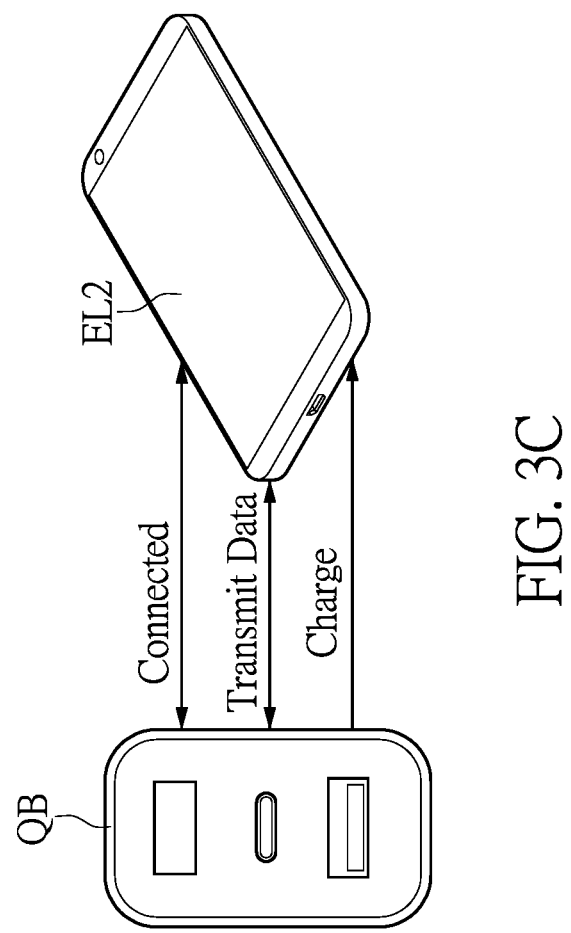
FIG. 3C is a schematic view of a device that has the function of simultaneously charging and backing up the data and is applied to the cell phone according to the embodiment of the present disclosure.

Reference is made to FIGS. 2C, 3A, 3B and 3C, in which FIG. 2C is a schematic view of an appearance of the device that has the function of simultaneously charging and backing up the data and includes different types of two transmission interfaces according to the embodiment of the present disclosure, FIG. 3A is a schematic view of the device that has the function of simultaneously charging and backing up the data and is applied to a laptop according to an embodiment of the present disclosure, FIG. 3B is a schematic view of the device that has the function of simultaneously charging and backing up the data and is applied to the laptop and a cell phone according to the embodiment of the present disclosure, and FIG. 3C is a schematic view of the device that has the function of simultaneously charging and backing up the data and is applied to the cell phone according to the embodiment of the present disclosure.

As shown in FIGS. 3A to 3C and 2C, the device QB having a function of simultaneously charging and backing up data includes different types of the first transmission interface 11 and the third transmission interface 13. In practice, the third transmission interface 13 may be replaced by other types of transmission interfaces, such as the second transmission interface 12 shown in FIG. 2B.

First, as shown in FIG. 3A, the device QB is connected to the first electronic device EL1 such as the laptop. When the first electronic device EL1 is connected to the device QB and does not have sufficient power, the first electronic device EL1 may be charged by the device QB.

As shown in FIG. 3A, when the first electronic device EL1 is connected to the device QB, data of the first electronic device EL1 may be accessed by the device QB and be backed up in a storage circuit 30 or a storage medium of the device QB shown in FIG. 2C. Alternatively, the device QB may transmit data stored in the storage circuit 30 to the first electronic device ELL in which the data may be data of the first electronic device EL1 that was previously backed up in the storage circuit 30, but the present disclosure is not limited thereto. In the embodiment, the same data is copied and pasted during the backing up of the data. However, the data may be cut and moved in practice.

Then, as shown in FIG. 3B, the second electronic device EL2 is also connected to the device QB. When both of the first electronic device EL1 and the second electronic device EL2 are connected to the device QB, the device QB may synchronously charge the first electronic device EL1 and the second electronic device EL2 and back up only the data of the first electronic device EL1 but not the data of the second electronic device EL2.

In other words, the plurality of electronic devices, such as the first electronic device EL1 and the second electronic device EL2 may be connected to a main control circuit 40 of the device QB respectively through a plurality of transmission interfaces, such as the first transmission interface 11 and the third transmission interface 13 of the device QB simultaneously. Under this condition, the main control circuit 40 gives permission to all of the electronic devices to be charged by the power supply circuit, but only gives permission to one of the electronic devices, such as the first electronic device EL1 that is most preferentially connected to the main control circuit 40 is given permission to be charged and transmit data to and/or from the device QB synchronously or asynchronously. That is, one-way or two-way data transmission between the one electronic device and the device QB is performed.

As described above, the first electronic device EL1 is given permission to be charged and the data of the first electronic device EL1 is given permission to be backed up synchronously. Under this condition, if the data of the second electronic device EL2 is intended to be backed up, the charge and data transmission wire needs to be unplugged from the first electronic device EL1 and the device QB, such that the connection between the first electronic device EL1 and the device QB is released. As a result, as shown in FIG. 3C, when only the second electronic device EL2 is connected to the device QB, the device QB gives permission to the second electronic device EL2 to be charged and the data of the second electronic device EL2 to be backed up.

Figure 4A:
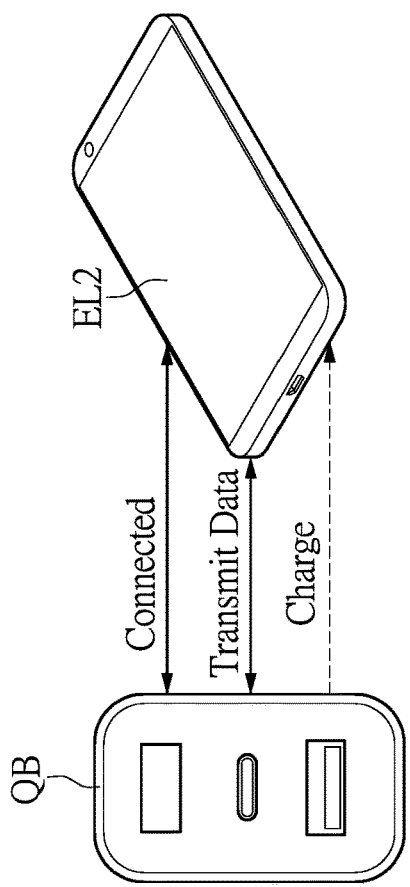
FIG. 4A is a schematic view of a device that has the function of simultaneously charging and backing up the data and is applied to a cell phone according to an embodiment of the present disclosure.
Figure 4B:
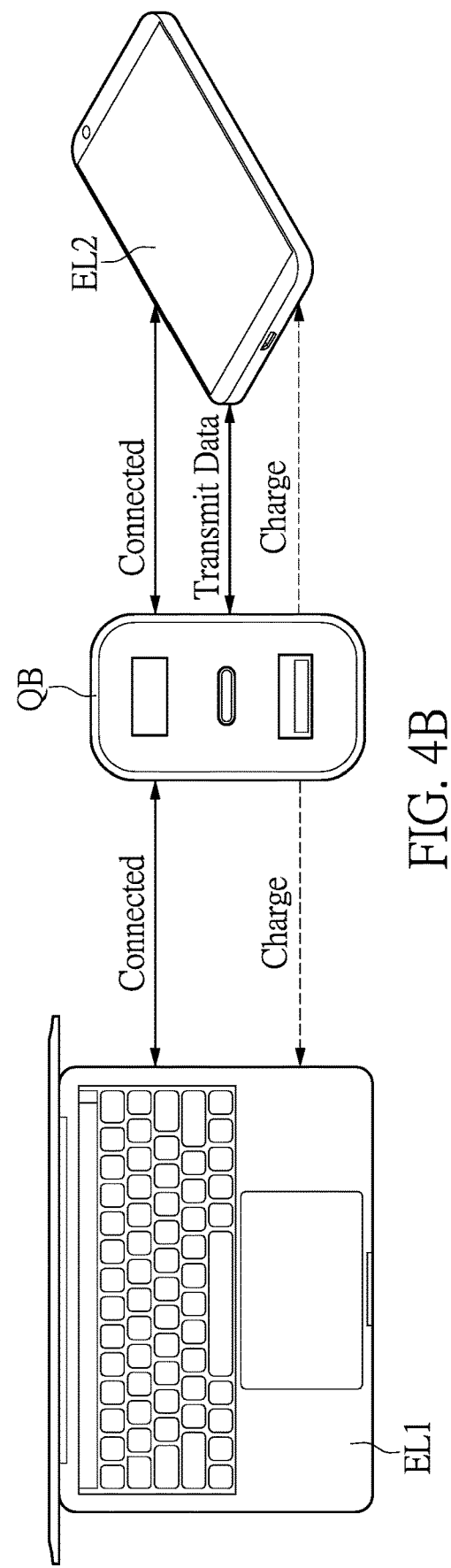
FIG. 4B is a schematic view of a device that has the function of simultaneously charging and backing up the data and is applied to a laptop and the cell phone according to the embodiment of the present disclosure.
Figure 4C:
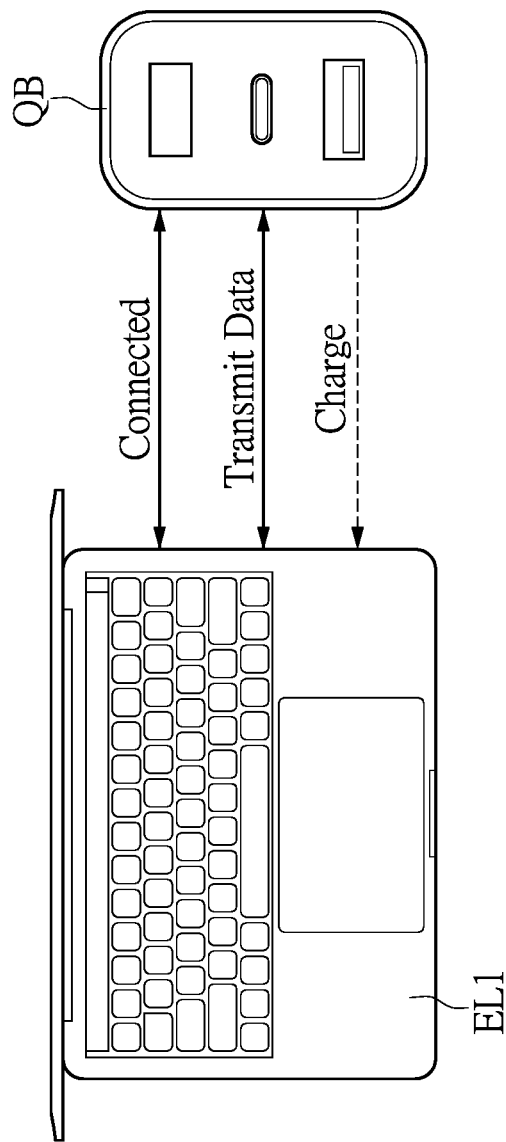
FIG. 4C is a schematic view of the device that has the function of simultaneously charging and backing up the data and is applied to the laptop according to the embodiment of the present disclosure.

Reference is made to FIGS. 2C, 4A, 4B and 4C, in which FIG. 2C is the schematic view of the appearance of the device that has the function of simultaneously charging and backing up the data and includes different types of two transmission interfaces according to the embodiment of the present disclosure. FIG. 4A is a schematic view of the device that has the function of simultaneously charging and backing up the data and is applied to a cell phone according to an embodiment of the present disclosure, FIG. 4B is a schematic view of the device that has the function of simultaneously charging and backing up the data and is applied to a laptop and the cell phone according to the embodiment of the present disclosure, and FIG. 4C is a schematic view of the device that has the function of simultaneously charging and backing up the data and is applied to the laptop according to the embodiment of the present disclosure.

As described above, in the embodiment of FIGS. 3A to 3C, the device QB is first connected to the first electronic device EL1, and then connected to the second electronic device EL2. Conversely, in the embodiments of FIGS. 4A to 4C, the device QB is first connected to the second electronic device EL2, and then connected to the first electronic device ELL Therefore, an operation of the embodiment of FIGS. 4A to 4C is different from that of the embodiment of FIGS. 3A to 3C, which is described specifically as follows.

First, as shown in FIG. 4A, when the device QB is only connected to the second electronic device EL2, the device QB may synchronously charge the second electronic device EL2 and back up the data of the second electronic device EL2.

As shown in FIG. 4B, the first electronic device EL1 is also connected to the device QB. When both of the first electronic device EL1 and the second electronic device EL2 are connected to the device QB, the first electronic device EL1 and the second electronic device EL2 can be charged by the device QB, but only the data of the second electronic device EL2 instead of the first electronic device EL1 is backed up by the device QB.

Then, as shown in FIG. 4C, when the connection between the device QB and the second electronic device EL2 is released, the first electronic device EL1 can be charged and the data of the first electronic device EL1 can also be backed up synchronously or asynchronously.

Figure 5:
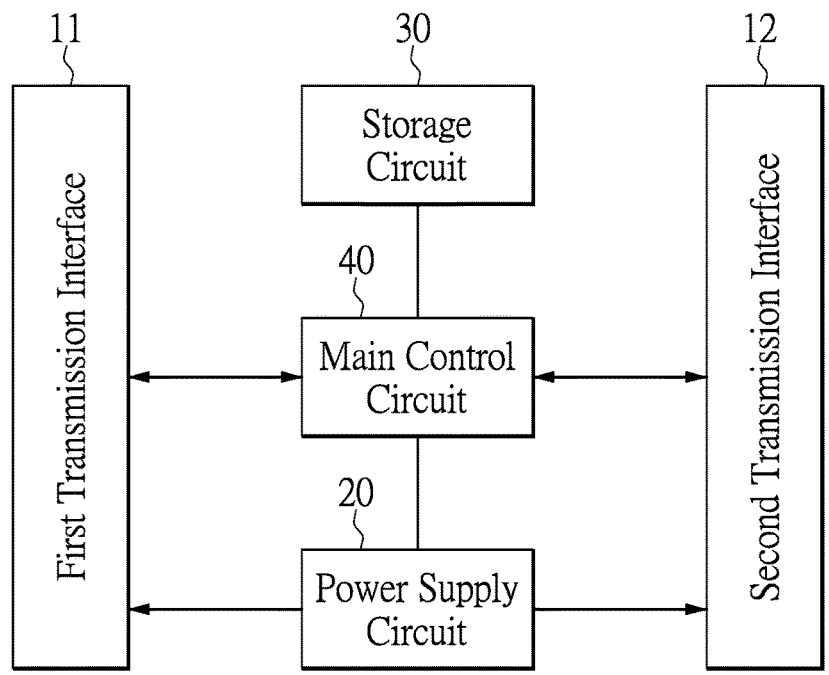
FIG. 5 is a block diagram of two transmission interfaces, a storage circuit, a main control circuit, and a power supply circuit of a device having a function of simultaneously charging and backing up data according to an embodiment of the present disclosure.

Reference is made to FIG. 5, which is a schematic view of two transmission interfaces, a storage circuit, a main control circuit and a power supply circuit of a device having a function of simultaneously charging and backing up data according to an embodiment of the present disclosure.

As shown in FIG. 5, the device having the function of simultaneously charging and backing up data may include a first transmission interface 11, a second transmission interface 12, a power supply circuit 20, a storage circuit 30 and a main control circuit 40. The main control circuit 40 is connected to the first transmission interface 11, the second transmission interface 12, the power supply circuit 20 and the storage circuit 30. The power supply circuit 20 is connected to the first transmission interface 11 and the second transmission interface 12.

The same type of the two transmission interfaces such as the first transmission interface 11 and the second transmission interface 12 are exemplified in the embodiment, but the present disclosure is not limited thereto. In practice, the first transmission interface 11 and the second transmission interface 12 may be replaced with other types of transmission interfaces and the quantity of the transmission interfaces may be increased or decreased.

The first transmission interface 11 and the second transmission interface 12 may be connected to the main control circuit 40 and the power supply circuit 20. For example, the first transmission interface 11 and the second transmission interface 12 may be connected to the main control circuit 40 through a USB data transmission wire, such as a USB 2.0, USB 3.0 or USB 4.0 transmission wire, but the present disclosure is not limited thereto. The first transmission interface 11 and the second transmission interface 12 may be connected to the power supply circuit 20 through a VBUS power wire, but the present disclosure is not limited thereto.

When the first electronic device is connected to the main control circuit 40 and the power supply circuit 20 through the first transmission interface 11, and the main control circuit 40 is connected to the power supply circuit 20, such that the main control circuit 40 may automatically or passively control the power supply circuit 20 to supply power to the first electronic device to charge the first electronic device.

Similarly, when the second electronic device is connected to the main control circuit 40 and the power supply circuit 20 through the second transmission interface 12, and the main control circuit 40 is connected to the power supply circuit 20, such that the main control circuit 40 may automatically or passively control the power supply circuit 20 to supply power to the second electronic device to charge the second electronic device.

For example, when the main control circuit 40 determines that the first electronic device is connected to the power supply circuit 20 through the first transmission interface 11, the main control circuit 40 automatically controls the power supply circuit 20 to supply power to the first electronic device. On the other hand, when the main control circuit 40 determines that the second electronic device is connected to the power supply circuit 20 through the second transmission interface 12, the main control circuit 40 automatically controls the power supply circuit 20 to supply power to the second electronic device.

More practically, when the main control circuit 40 determines that a remaining electric quantity of the first electronic device or the second electronic device is lower than a threshold value, or a ratio of the remaining electric quantity of the first electronic device or the second electronic device to a maximum electric quantity that the first electronic device or the second electronic device is able to store is lower than a threshold ratio, the main control circuit 40 automatically supplies appropriate power to the first electronic device or the second electronic device.

Additionally or alternatively, the main control circuit 40 receives a charging instruction from the first electronic device or the second electronic device, and then passively controls the power supply circuit 20 to supply power required by the charging instruction to the first electronic device or the second electronic device.

It is worth noting that, when one of the electronic devices, such as the first electronic device, is charged or not charged, one way or two-way data transmission between the first electronic device and the first transmission interface 11 may be performed. That is, the first electronic device can be charged and the data of the first electronic device can be backed up by the device having the function of simultaneously charging and backing up data in the embodiment.

When the main control circuit 40 gives permission to the first electronic device to transmit data, the first electronic device may provide the data to the main control circuit 40 through the first transmission interface 11, and then the main control circuit 40 transmits the data to the storage circuit 30 and controls the storage circuit 30 to access the data and back up the data of the first electronic device.

In addition, when the first electronic device is given permission to transmit data by the main control circuit 40, the main control circuit 40 may also obtain data stored in the storage circuit 30, and then transmit the data to the first electronic device through the first transmission interface 11. For example, when damage or other conditions occur to the first electronic device, such that the internal data of the first electronic device is lost, the first electronic device may obtain data previously backed up in the storage circuit 30. Alternatively, the first electronic device may obtain other data, such as the data of the second electronic device that was previously stored in the storage circuit 30, but the present disclosure is not limited thereto.

In the embodiment, when the first electronic device and the second electronic device are connected to the main control circuit 40 and the power supply circuit 20 respectively through the first transmission interface 11 and the second transmission interface 12, the main control circuit 40 may allow the first electronic device and the second electronic device to be charged synchronously or asynchronously. After the connection between the first electronic device and the first transmission interface 11 is released, the main control circuit 40 may give permission to the second electronic device to transmit data as described above.

Figure 6:
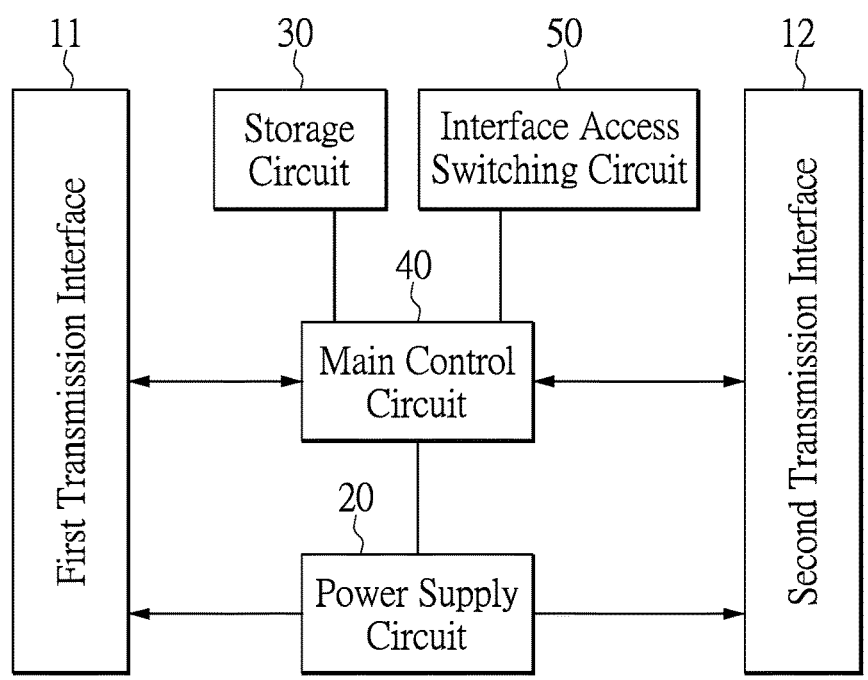
FIG. 6 is a block diagram of two transmission interfaces, a storage circuit, a main control circuit, a power supply circuit, and an interface access switching circuit of a device having a function of simultaneously charging and backing up data according to an embodiment of the present disclosure.

Reference is made to FIG. 6, which is a block diagram of two transmission interfaces, a storage circuit, a main control circuit, a power supply circuit and an interface access switching circuit of a device having a function of simultaneously charging and backing up data according to an embodiment of the present disclosure.

A difference between the embodiments of FIG. 5 and FIG. 6 is that, the device having the function of simultaneously charging and backing up data in the embodiment of FIG. 6 not only includes the first transmission interface 11, the second transmission interface 12, the power supply circuit 20, the storage circuit 30 and the main control circuit 40, but also includes an interface access switching circuit 50. The interface access switching circuit 50 is connected to the main control circuit 40.

The interface access switching circuit 50 may be a switch component, but the present disclosure is not limited thereto. The interface access switching circuit 50 may be configured to allow the storage circuit 30 to be connected to the first transmission interface 11 through the main control circuit 40, and the storage circuit 30 may be connected to the first electronic device through the first transmission interface 11. Alternatively, the interface access switching circuit 50 may be configured to allow the storage circuit 30 to be connected to the second transmission interface 12 through the main control circuit 40, and the storage circuit 30 may be connected to the second electronic device through the second transmission interface 12. In the above-mentioned configuration, the storage circuit 30 only accesses the data of one of the electronic devices, such as the first transmission interface 11 or the second transmission interface 12, or provides the data to the one electronic device, at each time point.

Figure 7:
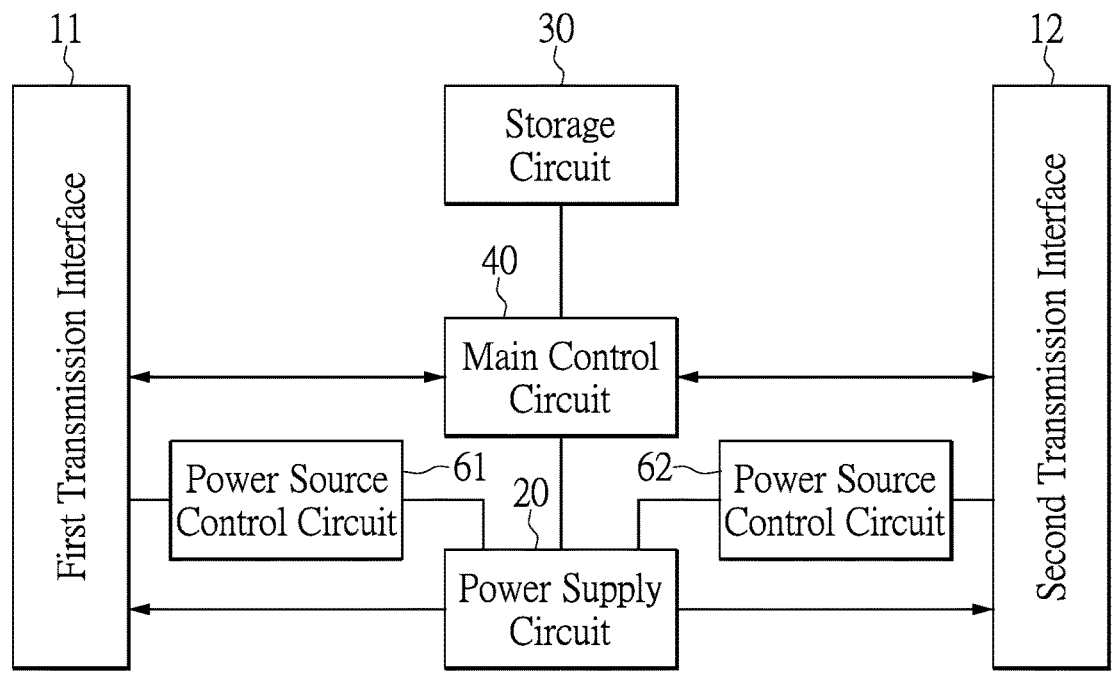
FIG. 7 is a block diagram of two transmission interfaces, a storage circuit, a main control circuit, a power supply circuit, and a power source control circuit of a device having a function of simultaneously charging and backing up data according to an embodiment of the present disclosure.

Reference is made to FIG. 7, which is a block diagram of two transmission interfaces, a storage circuit, a main control circuit, a power supply circuit and a power source control circuit of a device having a function of simultaneously charging and backing up data according to an embodiment of the present disclosure.

A difference between the embodiments of FIGS. 5 and 7 is that, the device having the function of simultaneously charging and backing up data in the embodiment of FIG. 7 not only includes the first transmission interface 11, the second transmission interface 12, the power supply circuit 20, the storage circuit 30 and the main control circuit 40, but also includes power source control circuits 61 and 62. The power source control circuits 61 and 62 are applicable to specific interfaces, such as the first transmission interface 11 and the second transmission interface 12 that may be Type-C interfaces.

The power source control circuit 61 is connected between the first transmission interface 11 and the power supply circuit 20, and the power source control circuit 62 is connected between the second transmission interface 12 and the power supply circuit 20.

The power source control circuit 61 may obtain a first power demand message through the first transmission interface 11 from the first electronic device. The power source control circuit 61 may determine a state of the first electronic device, such as the maximum electric quantity that the first electronic device is able to store, the remaining electric quantity of the first electronic device, a program that will be executed by the first electronic device, and an electric quantity required for the first electronic device to execute the program, according to the first power demand information. The power source control circuit 61 controls the power supply circuit 20 to supply appropriate power to the first electronic device according to the first power demand information. Similarly, the power source control circuit 62 may obtain a second power demand message through the second transmission interface 12 from the second electronic device, and control the power supply circuit 20 to supply appropriate power to the second electronic device according to the second power demand message.

Figure 8:
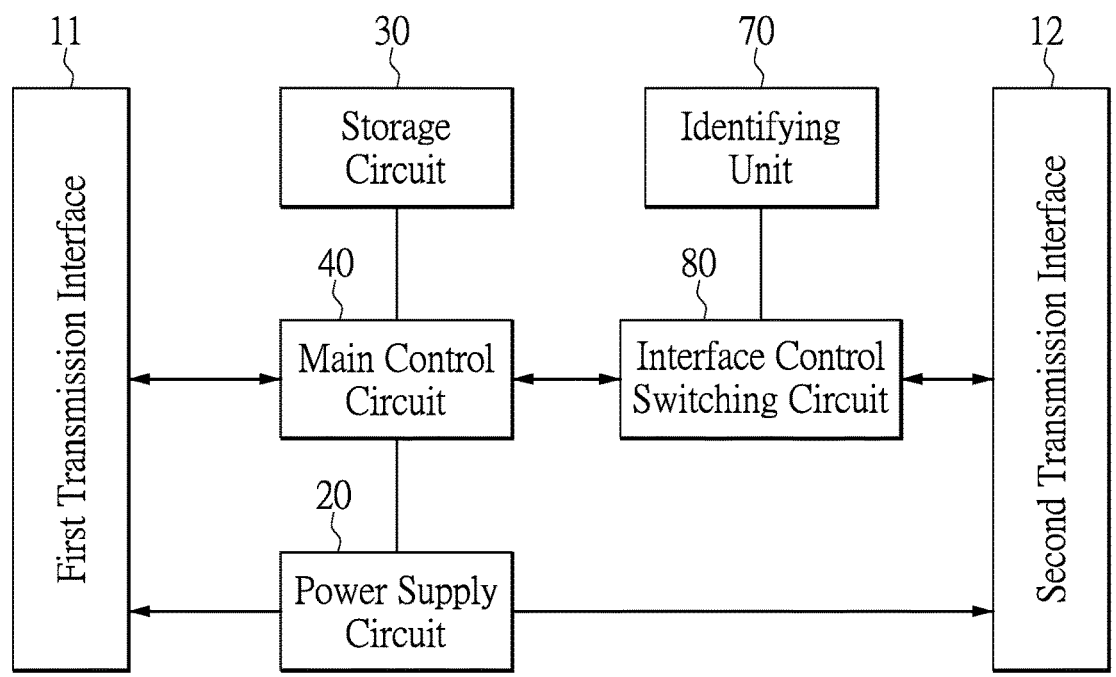
FIG. 8 is a block diagram of two transmission interfaces, a storage circuit, a main control circuit, a power supply circuit, an identifying unit and an interface control switching circuit of a device having a function of simultaneously charging and backing up data according to an embodiment of the present disclosure.

Reference is made to FIG. 8, which is a block diagram of two transmission interfaces, a storage circuit, a main control circuit, a power supply circuit, an identifying unit and an interface control switching circuit of a device having a function of simultaneously charging and backing up data according to an embodiment of the present disclosure.

A difference between the embodiments of FIG. 5 and FIG. 8 is that, the device having the function of simultaneously charging and backing up data in the embodiment of FIG. 8 not only includes the first transmission interface 11, the second transmission interface 12, the power supply circuit 20, the storage circuit 30 and the main control circuit 40, but also includes an identifying unit 70 and an interface control switching circuit 80.

The interface control switching circuit 80 may be connected to the identifying unit 70, and connected between the main control circuit 40 and the second transmission interface 12. The interface control switching circuit 80 may be a switch component, but the present disclosure is not limited thereto. The interface control switching circuit 80 may be configured to allow the second transmission interface 12 to be connected to the main control circuit 40 through the interface control switching circuit 80, or prohibit the second transmission interface 12 from being connected to the main control circuit 40 through the interface control switching circuit 80.

The second electronic device may provide an identification message, such as but not limited to a unique identification code of the second electronic device. The identification message is transmitted to the identifying unit 70 through the second transmission interface 12 (and the interface control switching circuit 80) from the second electronic device. The identifying unit 70 analyzes the received identification message and accordingly determines authorities of the second electronic device, such as authorities of charging and transmitting data, and accordingly controls the operation of the interface control switching circuit 80.

When the identifying unit 70 successfully identifies the second electronic device, the interface control switching circuit 80 allows the second electronic device to be connected to the main control circuit 40 through the second transmission interface 12. Conversely, when the identifying unit 70 does not successfully identify the second electronic device, the control interface control switching circuit 80 prohibits the second electronic device from being connected to the main control circuit 40 through the second transmission interface 12.

It should be understood that, if necessary, another interface control switching circuit may also be connected between the first transmission interface 11 and the main control circuit 40, and connected to another identifying unit, so as to be applied to the first electronic device. The operations of the identifying unit 70 and the interface control switching circuit 80 for the second electronic device as described above may be substantially the same as that of the another identifying unit and the another interface control switching circuit.

Figure 9:
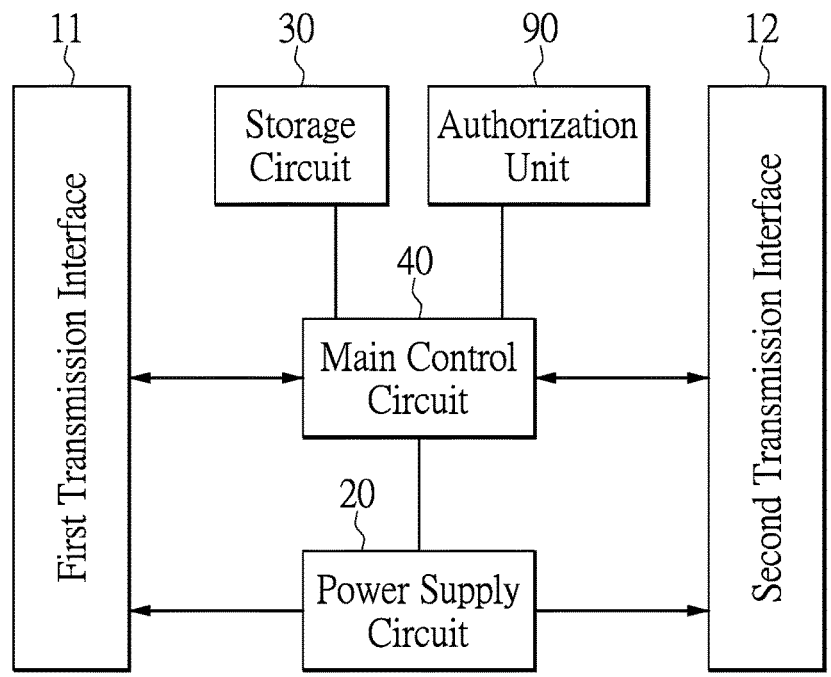
FIG. 9 is a block diagram of two transmission interfaces, a storage circuit, a main control circuit, a power supply circuit, and an authorization unit of a device having a function of simultaneously charging and backing up data according to an embodiment of the present disclosure.

Reference is made to FIG. 9, which is a block diagram of two transmission interfaces, a storage circuit, a main control circuit, a power supply circuit and an authorization unit of a device having a function of simultaneously charging and backing up data according to an embodiment of the present disclosure.

It should be understood that operating systems of some electronic products on the market require authentication. If the authentication is successful, then a data access operation and other operations are allowed to be performed on the electronic products. Accordingly, a difference between the embodiments of FIG. 5 and FIG. 9 is that, the device having the function of simultaneously charging and backing up data in the embodiment of FIG. 9 not only includes the first transmission interface 11, the second transmission interface 12, the power supply circuit 20, the storage circuit 30 and the main control circuit 40, but also includes an authorization unit 90.

The authorization unit 90 may be connected to the main control circuit 40. Before data transmission or other operations are performed between the main control circuit 40 and the data of the first electronic device or the second electronic device, the first electronic device or the second electronic device that uses a specific operating system will output an authentication request for completing an (identity) authentication.

The main control circuit 40 obtains an authorization message from the authorization unit 90 according to the authentication request, and transmits the authorization message to the first electronic device through the first transmission interface 11 or to the second electronic device through the second transmission interface 12. As a result, the main control circuit 40 is given permission to use the first electronic device or the second transmission interface. For example, the main control circuit 40 is given permission to access the data of the first electronic device or the second electronic device.

Figure 10:
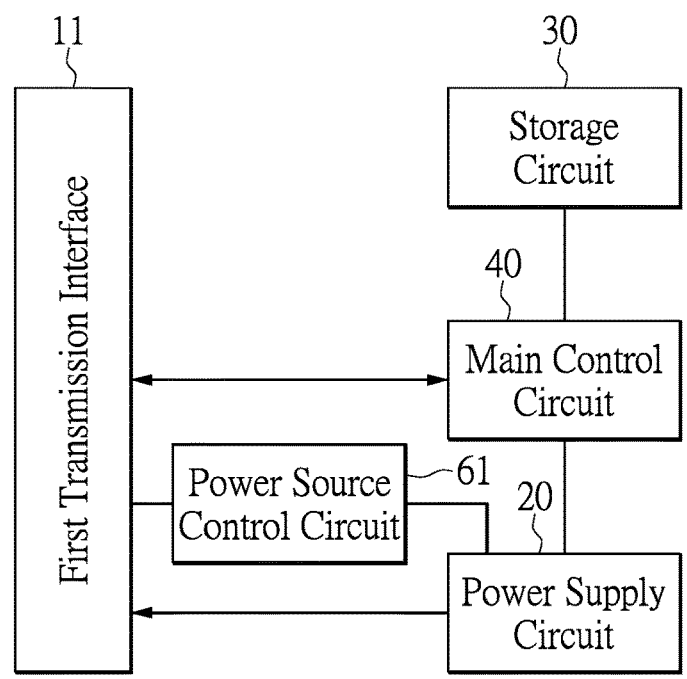
FIG. 10 is a block diagram of one transmission interface, a storage circuit, a main control circuit, a power supply circuit, and a power source control circuit of a device having a function of simultaneously charging and backing up data according to an embodiment of the present disclosure.

Reference is made to FIG. 10, which is a block diagram of one transmission interface, a storage circuit, a main control circuit, a power supply circuit and a power source control circuit of a device having a function of simultaneously charging and backing up data according to an embodiment of the present disclosure.

As shown in FIG. 10, in the embodiment, the device having the function of simultaneously charging and backing up data may include the first transmission interface 11, the power supply circuit 20, the storage circuit 30, the main control circuit 40 and the power source control circuit 61, which are applied to one electronic device, such as the first electronic device. If the device having the function of simultaneously charging and backing up data as shown in FIG. 10 is intended to be applied to a plurality of electronic devices, such as two electronic devices, the configuration of the device shown in FIG. 10 may be adjusted to be the same as that of the device shown in FIG. 7.

When the first electronic device is connected to the main control circuit 40 through the first transmission interface 11, the main control circuit 40 may automatically or passively (for example, manually) control the storage circuit 30 to access the data of the first electronic device or provide data to the first electronic device, and control the power supply circuit 20 to supply power to the first electronic device. Therefore, the first electronic device may be charged and the data of the first electronic device may be backed up simultaneously, thereby saving a lot of time.

In summary, the present disclosure provides the device having the function of simultaneously charging and backing up data, which is able to charge the electronic devices, such as the cell phone or the laptop and back up the data of the electronic device simultaneously, thereby saving a lot of time for a user. The device of the present disclosure is convenient to carry and use for simultaneously charging and backing up data without using additional devices.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A device having a function of simultaneously charging and backing up data, comprising:
    a plurality of transmission interfaces including a first transmission interface and a second transmission interface, wherein the first transmission interface is adapted to be connected to a first electronic device, the second transmission interface is adapted to be connected to a second electronic device, the first transmission interface is configured to receive data from the first electronic device or transmit the data received from the first electronic device to the first electronic device, and the second transmission interface is configured to receive data from the second electronic device or transmit the data received from the second electronic device to the second electronic device;
    a power supply circuit connected to the first transmission interface and the second transmission interface;
    a storage circuit configured to access the data of the first electronic device or the data of the second electronic device, or provide the data stored in the storage circuit;
    a plurality of power source control circuits, wherein one of the plurality of power source control circuits is connected to the first transmission interface and obtains a first power demand message through the first transmission interface from the first electronic device, determines a maximum electric quantity that the first electronic device is able to store, a remaining electric quantity of the first electronic device, a program that will be executed by the first electronic device and an electric quantity required for the first electronic device to execute the program according to the first power demand message, and controls the power supply circuit to supply power to charge the first electronic device through the first transmission interface, and another power source control circuit is connected to the second transmission interface and the power supply circuit and obtains a second power demand message through the second transmission interface through the second transmission interface from the second electronic device, determines a maximum electric quantity that the second electronic device is able to store, a remaining electric quantity of the second electronic device, a program that will be executed by the second electronic device and an electric quantity required for the second electronic device to execute the program according to the second power demand message, and controls the power supply circuit to supply power to charge the second electronic device through the second transmission interface;
    a main control circuit connected to the first transmission interface, the second transmission interface, the power supply circuit, and the storage circuit; and
    an authorization unit connected to the main control circuit, authenticating an authentication request received from the first electronic device or the second electronic device through the main control circuit to generate an authorization message associated with the first electronic device or the second electronic device, and outputting the authorization message to the main control circuit;
    wherein when determining that the first electronic device and the second electronic device are connected to the power supply circuit through the first transmission interface and the second transmission interface respectively and one of the first electronic device and the second electronic device is successfully authenticated according to the authentication message, the main control circuit controls the power supply circuit to supply power to the first electronic device and the second electronic device and simultaneously controls the storage circuit to connect to a corresponding one of the first transmission interface and the second transmission interface therethrough to back up data of the successfully authenticated one of the first electronic device and the second electronic device to the storage circuit or to provide the data of the successfully authenticated one of the first electronic device and the second electronic device in the storage circuit to the successfully authenticated one of the first electronic device and the second electronic device.

2. The device as claimed in claim 1, further comprising an interface control switching circuit connected between the main control circuit and the first transmission interface or the second transmission interface, and configured to allow the first transmission interface or the second transmission interface to be connected to the main control circuit through the interface control switching circuit or prohibit the first transmission interface or the second transmission interface from being connected to the main control circuit through the interface control switching circuit.

3. The device as claimed in claim 2, further comprising an identifying unit connected to the interface control switching circuit, wherein an identification message of the second electronic device is transmitted to the identifying unit sequentially through the second transmission interface and the interface control switching circuit from the second electronic device.

4. The device as claimed in claim 1, further comprising an interface access switching circuit connected to the main control circuit, wherein the interface access switching circuit is configured to allow the storage circuit to be connected to the first transmission interface or the second transmission interface through the main control circuit.

* * * * *